United States Patent [19]
Anson et al.

[11] Patent Number: 5,161,455
[45] Date of Patent: Nov. 10, 1992

[54] COMBINATION COFFEE AND TEA BREWER

[75] Inventors: James H. Anson, Auburn; Alan W. Brewer, Divernon; Ray E. Bledsoe, Jr., New Berlin, all of Ill.

[73] Assignee: Bunn-O-Matic Corporation, Springfield, Ill.

[21] Appl. No.: 701,459

[22] Filed: May 15, 1991

[51] Int. Cl.$^5$ ............................................ A47J 31/10
[52] U.S. Cl. ........................................ 99/280; 99/299; 141/378
[58] Field of Search .................. 99/279–285, 99/288, 294, 300, 295, 304–307, 282, 284; 426/433; 141/341, 375, 378

[56] References Cited

U.S. PATENT DOCUMENTS

| | | | |
|---|---|---|---|
| 192,348 | 6/1877 | Preston | 141/341 |
| 3,034,417 | 10/1964 | Bunn | 99/283 |
| 3,072,042 | 1/1965 | Davis | 99/283 |
| 3,179,035 | 4/1965 | Lockett | 99/282 |
| 3,525,852 | 8/1970 | Filipak | 99/282 |
| 3,632,982 | 1/1972 | Linger | 99/282 |
| 3,791,284 | 2/1974 | Donot | 99/289 |
| 4,406,942 | 9/1983 | Lo Conti | 99/288 |
| 4,728,281 | 3/1988 | McGuffin et al. | 426/433 |
| 4,773,313 | 9/1988 | Anson | 99/279 |
| 4,809,594 | 3/1989 | Vitous | 99/280 |

FOREIGN PATENT DOCUMENTS

| | | | |
|---|---|---|---|
| 0140644 | 4/1951 | Australia | 99/288 |
| 0934178 | 9/1973 | Canada | 99/304 |
| 0017247 | 9/1881 | Fed. Rep. of Germany | 141/378 |
| 1429959 | 4/1969 | Fed. Rep. of Germany | 99/300 |

Primary Examiner—Harvey C. Hornsby
Assistant Examiner—James F. Hook
Attorney, Agent, or Firm—Trexler, Bushnell, Giangiorgi & Blackstone, Ltd.

[57] ABSTRACT

A beverage brewing device that can be used to make either hot coffee or iced tea has a retractable decanter support platform which is capable of translation between an extended position and a retracted position. When the support platform is in the extended position, it can accept and support a small decanter for use in receiving the brewed beverage. The support platform has a warming plate which maintains the temperature of the beverage. When the support platform is in the retracted position, the platform is positioned to enable a large decanter to be placed on the base of the device. The beverage brewing device also has an electric circuit capable of causing the beverage brewing device to brew coffee when the decanter support platform is in the extended position, and causing the beverage brewing device to brew tea when the decanter support platform is in the retracted position.

14 Claims, 6 Drawing Sheets

COMBINATION COFFEE AND TEA BREWER

BACKGROUND AND SUMMARY OF THE INVENTION

The present invention relates generally to an innovative addition to, and structure of a beverage brewing device, and particularly to a combination coffee and tea brewing device. These brewing devices are quite common, and are used almost exclusively in producing brewed beverages. The popularity of these beverage brewing devices is due to their ability to make a freshly brewed beverage directly from brewing material, such as coffee grounds, tea leaves, and the like, instead of producing such a beverage from an instant, dehydrated concentrate. Due to the disfavor that the consuming public has with instant beverages, this ability is a highly desirable advantage.

However, these beverage brewing devices do have certain disadvantages. Many of these devices are designed with a particular configuration and size of server or decanter in mind. This means that the brewing device can be used to make, at the maximum, an amount of beverage limited by the size of the decanter. In the commercial setting, the demand for freshly brewed beverages varies with time. There are certain peak periods during which a large amount of brewed beverage is required, and certain non-peak periods during which a small amount of brewed beverage is required. This periodic shift in brewed beverage demand can be met effectively by having a large supply of decanters, by having a plurality of beverage brewing devices, or by having one set of brewing devices designed for use with small decanters, employed during the non-peak periods, and one set of brewing devices designed for use with large decanters, employed during the peak periods.

Another consideration is the quality of the beverage brewed, and the tidiness of the brewing process. If the brewed beverage must travel a significant distance before entering a decanter, then the beverage has a longer time for reacting with the surrounding atmosphere. It is believed that this reaction lessens the quality of the beverage. Also, the greater the distance between the brewing funnel and the decanter, the chance that the beverage will splatter, or become misdirected increases, usually resulting in an unkempt appearance of the area surrounding the brewing apparatus.

Given these considerations, the commercial user would like to have one beverage brewing device to fulfill the employment of two, with the distance between the brewing funnel and the decanter being as small as possible, no matter what size of decanter is used. Specifically, a beverage brewing device which can be used with a large decanter, and a small decanter, with the distance between the brewing funnel, and the decanter being as small as possible, is desired. In this manner, the commercial user will have to purchase only one brewing device, thereby saving money. Also, because the maximum output of the brewing device is variable, the commercial user can save money further by not over-producing brewed beverages, which will have to be discarded after a certain time period. Further, the quality of the beverage will not be compromised by prolonged exposure to the surrounding atmosphere, and the area around the brewing device will not be subject to excessive beverage splattering.

OBJECTS AND SUMMARY OF THE INVENTION

A general object of the invention is to provide a beverage brewing device that can be employed for use with decanters of various sizes.

Another object of the invention is to provide a beverage brewing device that has a retractable decanter support platform that has a warming plate.

An additional object of the invention is to provide a beverage brewing device that maintains the distance between the brewing funnel and the decanter constant, so as to minimize the chance of the beverage from reacting with the atmosphere. A further object of the invention is to provide a beverage brewing device that can produce either a hot or cold freshly brewed beverage.

An additional object of the present invention is to provide a beverage brewing device that can be use to produce either hot coffee or iced tea.

A further object of the invention is to provide a beverage brewing device having a retractable decanter support platform and another decanter support platform, so that the brewing device can support at least two decanters at any given moment.

Another object of the present invention is to provide a beverage brewing device having an electric circuit which controls the operation of the beverage brewing device according to the position of the decanter support platform.

The beverage brewing device of the present invention is unique in that it has a retractable decanter support platform disposed about the trunk of the device at a location so as to position a small decanter in proper placement below a brewing funnel to accept a brewed beverage. The decanter support platform has a warming plate disposed on it. The decanter support platform is retractable into the trunk of the device so that the device may accept a substantially larger decanter in the proper position below a brewing funnel for accepting a brewed beverage. This beverage brewing device can be employed effectively to produce either hot coffee or iced tea. The beverage brewing device also has an electric circuit capable of allowing the beverage brewing device to brew coffee when the decanter support platform is in the extended position, and allowing the beverage brewing device to brew tea when the decanter support platform is in the retracted position.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which.

DETAILED DESCRIPTION OF A PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 1:
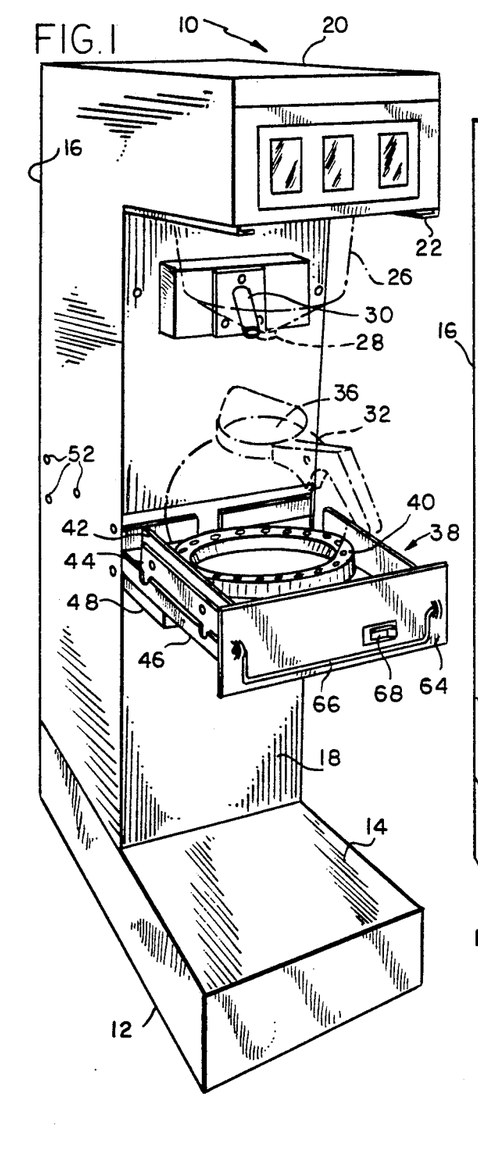
FIG. 1 is a perspective view of a beverage brewing device, constructed according to the teachings of the present invention, showing the extended disposition of a decanter support platform, as it supports a decanter of small size.
Figure 2:
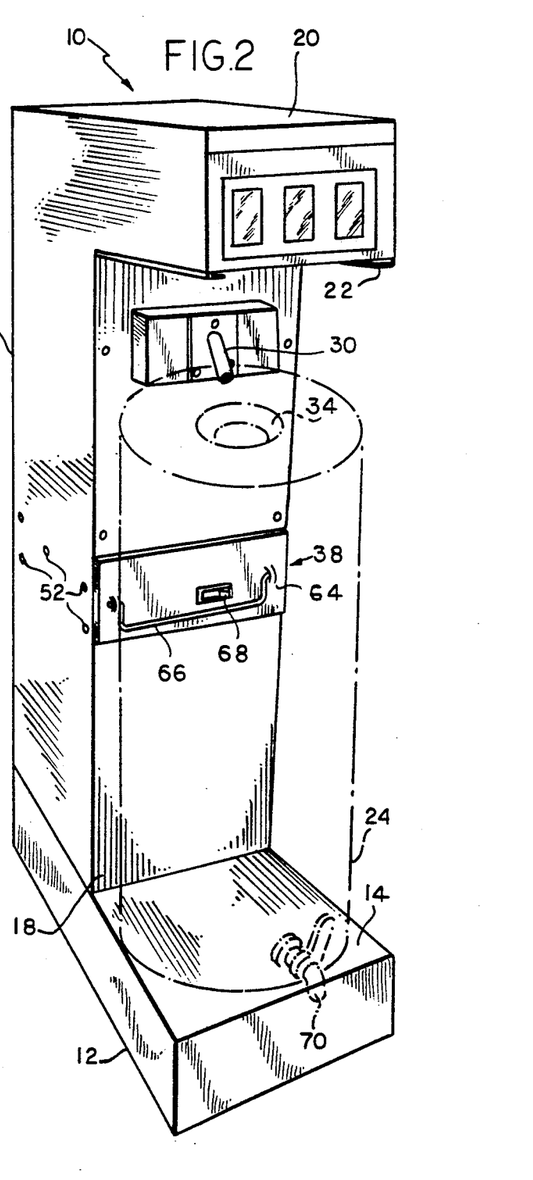
FIG. 2 is a perspective view of the beverage brewing device of FIG. 1, showing the retracted disposition of the decanter support platform, with the device accepting a decanter of substantially large size; 5

Referring generally to FIG. 1 and FIG. 2, a beverage brewing device 10, useful for brewing either hot coffee or iced tea, is disclosed. The superstructure of the beverage brewing device 10 is comprised of a base portion 12, having a first support, or a top panel 14, a trunk portion 16 having a front panel 18, disposed on, and substantially perpendicular to the base portion 12, and an overhanging or cantilevered portion 20 having a slot 22, disposed on, and being substantially perpendicular to the trunk portion 16, and being substantially parallel to the base portion 12. The trunk portion 16 connects the base portion 12 to the cantilevered portion 20. The trunk portion 16 is substantially vertical in nature, whereas the base portion 12, and the cantilevered portion 20 are substantially horizontal in nature.

The top panel 14 of the base portion 12 is substantially horizontal, and flat, and comprises means capable of accepting and supporting a large decanter 24, as shown in FIG. 2. The slot 22 is disposed on the side of the cantilevered portion 20 opposing the base portion 12. The slot 22 is of such a form that the slot 22 can accept readily and support brewing funnel 26 beneath the cantilevered portion 20 of the brewing device 10. The brewing funnel 26 is of known construction, and is similar to the funnel disclosed in the patent of Martin, U.S. Pat. No. 3,374,897, which is assigned to the assignee of the present invention. Also disposed about the cantilevered portion 20 is a hot water outlet, not shown, but similar in construction to the spray head disclosed in the patent of Martin, et al., U.S. Pat. No. 3,626,839, which is assigned to the assignee of the present invention. The hot water outlet delivers hot water to the interior of the brewing funnel 26 to commence the brewing process, which is well known in the field.

A discharge point, or opening 28 is disposed on the bottom of the brewing funnel 26, and it is through this opening 28 that, in the case of brewing hot coffee, the freshly brewed coffee flows, or, in the case of brewing iced tea, the hot, freshly brewed tea concentrate flows. In the case of brewing iced tea, a source of cold, diluting water is needed to decrease the temperature of the hot, freshly brewed tea concentrate, and to dilute that concentrate to desired levels. To fulfill this need, a diluting water outlet 30 is disposed, below the cantilevered portion 20 and the brewing funnel 26, about and through the front panel 18 of the trunk portion 16. The diluting water outlet 30 is disposed between the opening 28 of the brewing funnel 26, and a upper inlet opening 34 of the large decanter 24 so that diluting water may be added to the beverage concentrate, as the concentrate enters the large decanter 24.

Disposed in the trunk portion 16, and through the front panel 18 of the trunk 16 of the brewing device 10 between the diluting water outlet 30, and the top panel 14 of the base portion 12, is a second support, or a retractable decanter support platform 38 which is capable of supporting the small decanter 32, as shown in FIG. 1. The decanter support platform 38 is located in the trunk 16 at a specified distance from the cantilevered portion 20 so that the decanter support platform 38 can accept a small decanter 32, and maintain the small decanter 32 in a proper position below the brewing funnel 26, so as to allow the brewing device 10 to produce both hot coffee or other beverage, and to deliver those beverages to the small decanter 32. The decanter support platform 38 is capable of translation between an extended position, as shown in FIG. 1, and a retracted position, as shown in FIG. 2.

Figure 7:
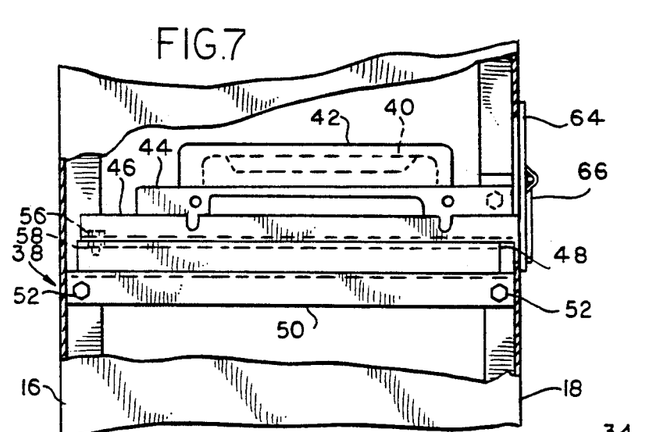
FIG. 7 is an enlarged fragmentary view, taken along line 7—7 of FIG. 3, of the decanter support platform, showing its disposition in the retracted position.
Figure 8:
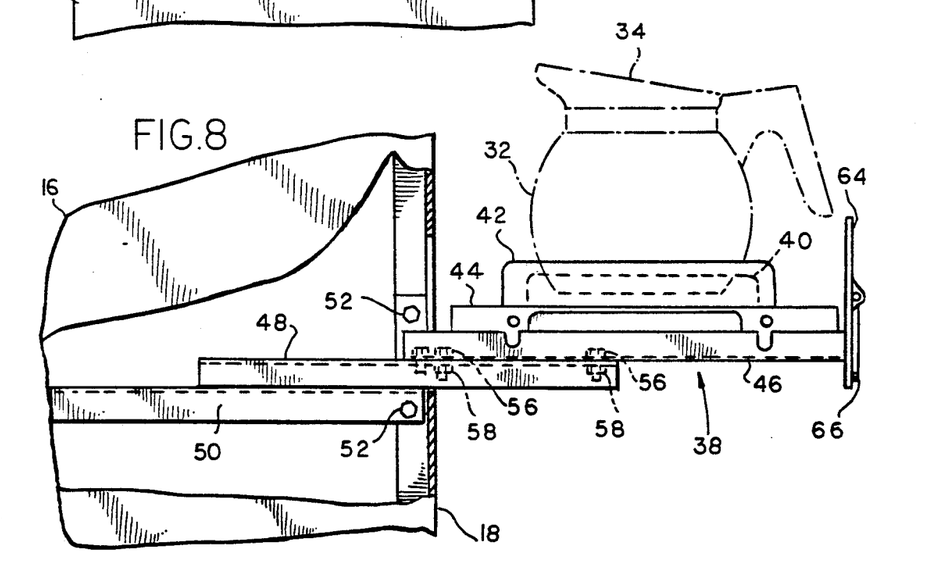
FIG. 8 is an enlarged fragmentary view, taken along line 8—8 of FIG. 4, but showing the decanter support platform in the extended position, with a decanter disposed on it.

The particular construction of the decanter support platform 38 will become evident in the following discussion. Referring initially to FIG. 7, and FIG. 8, the decanter support platform 38 is comprised of a number of parts, namely, a warming plate 40, a retainer 42, a base 44, a sliding portion 46, a retracting portion 48, and a mounting portion 50. The mounting portion 50 is disposed, in its entirety, inside the trunk 16 of the brewing device 10. The mounting portion 50 is fixed securely to the interior of the trunk 16 by means of a plurality of bolts 52, so that the mounting portion 50 is immovable, and is capable of supporting the entire weight of the decanter support platform 38, especially while the decanter support platform 38 is in the extended position with a small decanter 32, full of beverage, disposed upon the decanter support platform 38.

The retracting portion 48 is mounted translatably above and upon the mounting portion 50 so that the retracting portion 48 can translate freely between the extended, and the retracted positions. The retracting portion 48 has a plurality of screw apertures 54 disposed through it. The screw apertures 54 are of sufficient diameter to accept screws 56 having nuts 58 which assure that the screws 56 will remain firmly inside the screw apertures 54. By means of these screws 56 and nuts 58, the sliding portion 46 is mounted to the retracting portion 48.

Figure 5:
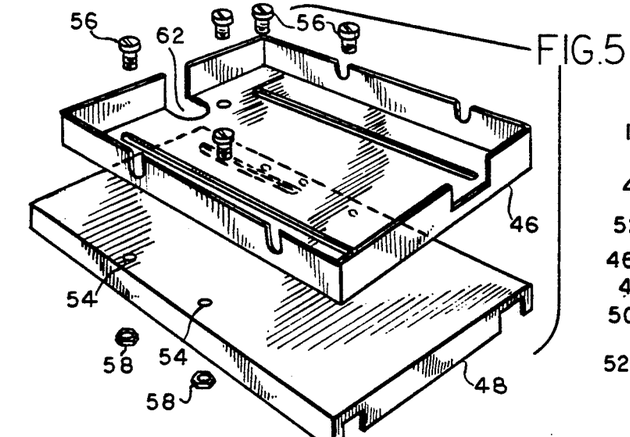
FIG. 5 is an exploded perspective view of the decanter support platform, showing its basic construction.
Figure 6:
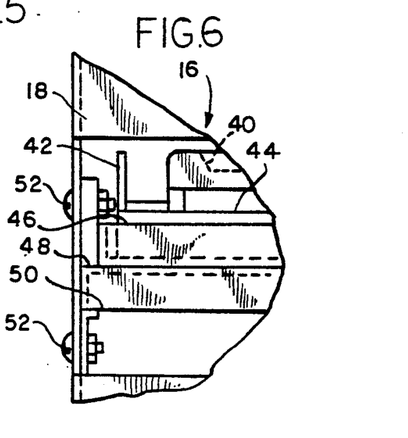
FIG. 6 is an enlarged fragmentary view of the decanter support platform with its front panel removed, showing the disposition of the platform when it is in its retracted position.

The sliding portion 46 is mounted translatably above and upon the retracting portion 48 so that the sliding portion 46 can translate freely between the extended, and the retracted positions. To accomplish this translation, the sliding portion 46 has a plurality of slots 60 disposed through it. The slots 60 are of sufficient width to accept the threaded portions of the screws 56, but that width is small enough so as not to allow the head of the screws 56 to pass through the slots 60. The sliding portion 46 also has an aperture 62 disposed about the rear of the sliding portion 46, as shown in FIG. 5. This aperture 62 is of sufficient size, and is disposed in a particular location so as to accommodate any wiring or plumbing that may be disposed within the interior of the trunk portion 16 of the brewing device 10, when the decanter support platform is in the retracted position.

The screws 56 are disposed with the screw heads located above the upper surface of the sliding portion 46, the threaded portions of the screws 56 extending through the slots 60 of the sliding portion 46, the screw apertures 54 of the retracting portion 48, and secured by the nuts 58. The nuts 58 are threaded upon the screws 56 a sufficient number of turns so as to apply a force to the sliding portion 46 and the retracting portion 48. The force is of sufficient magnitude so as to bind the sliding portion 46 to the retracting portion 48, and to support the decanter support platform 38 effectively, while at the same time, the force is small enough to allow the sliding portion 46 to translate freely above the retracting portion 48 between the extended and retracted positions.

A front panel 64 is mounted on the front of the sliding portion 26. The front panel 64 of the decanter support platform 38 is constructed of materials similar to that of the front panel 18 of the trunk portion 16 of the brewing device 10. The front panel 64 of the support platform 38 is of sufficient size to cover entirely one end of the support platform 38. This allows the front panel 18 of the trunk portion 16 to appear continuous when the support platform 38 is in the retracted position.

There is translation means, such as a handle 66, and an indicator light 68 disposed on the front panel 64 of the support platform 38. The handle 66 is of such disposition and construction so as to facilitate the application of a force to the support platform 38, so as to allow free translation of the decanter support platform 38 between the extended and the retracted position. Also, the handle 66 is constructed so as not to interfere with or obstruct the disposition of the large decanter 24 when the support platform 38 is in the retracted position. The indicator light 68 is also constructed so as not to interfere with or obstruct the disposition of the large decanter 24. The indicator light 68, which is lit if the warming plate 40 is energized, is connected electrically to a warming plate 40, and an electric circuit 90, shown schematically in FIG. 12, which controls the operation of the warming plate 40. The construction and operation of the electric circuit 90 will be discussed herein.

Disposed upon the sliding portion 46 is the base 44. The base 44 is fixed in position upon the sliding portion 46. The base 44 supports a retainer 42, the warming plate 40, and the small decanter 32. The warming plate 40 is disposed on top of the base 44, and is of known construction. The warming plate 40 employs electricity to produce heat, in order to keep the small decanter 32, and the beverage disposed therein warm. The operation of the warming plate 40 is governed by the electric circuit 90. The warming plate 40 has a depression of such a size so as to accept the bottom of the small decanter 32. This particular construction assures that the small decanter 32 will be maintained in a proper position on the brewing device 10 for brewing beverages, and storing those beverages, and also allows for heat to be applied to the sides of the small decanter 32 so as to keep the brewed beverage disposed therein warm.

The retainer 42 is mounted on opposing sides of the base 44. The retainer 42 extends upward perpendicularly to the plane of the decanter support platform 38, and assists in maintaining the small decanter 32 in the proper position. Furthermore, the retainer 42 is of such a construction so as to protect the small decanter 32 from damage, and to contain, to a degree, any spills of brewed beverage from the small decanter 32.

Figure 12:
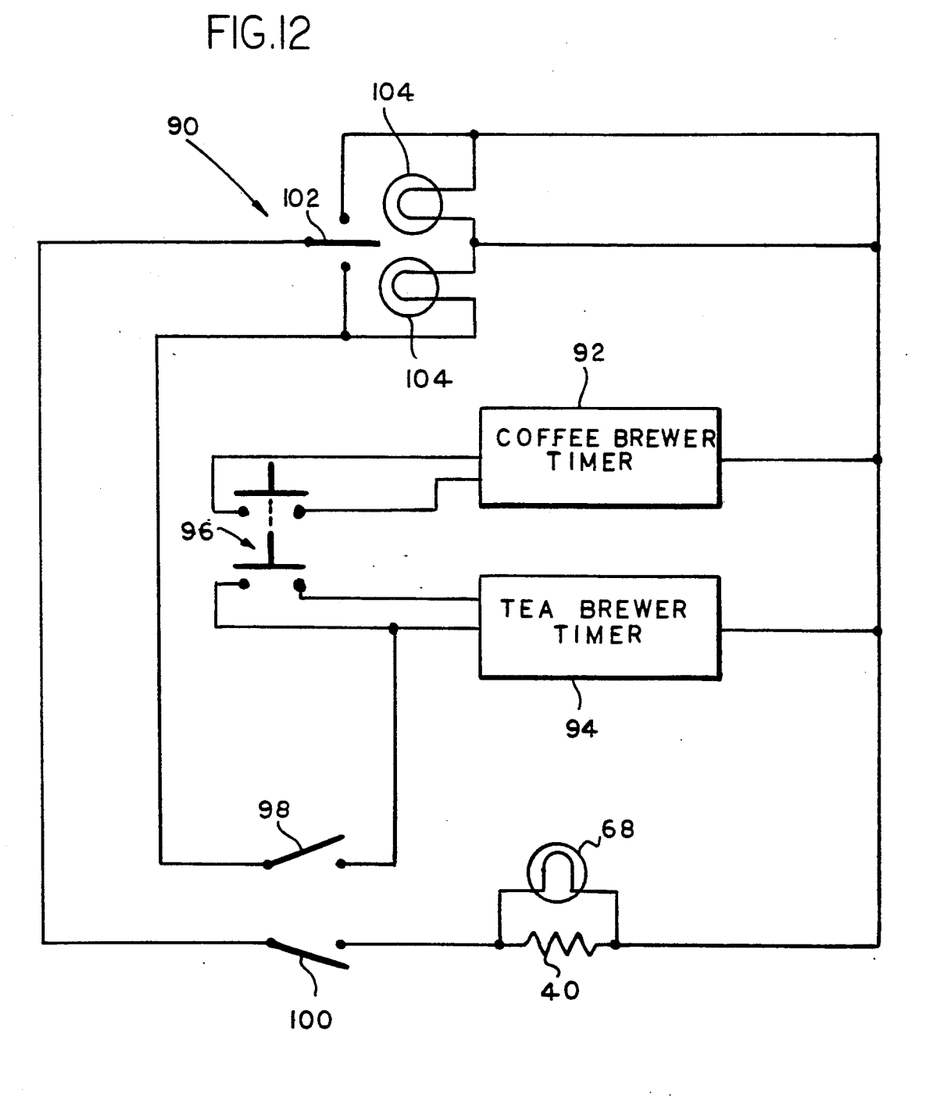
FIG. 12 is a schematic diagram of an electric circuit employed by both embodiments of the invention which controls the operation of elements of the beverage brewing device according to the position of the decanter support platform.

The construction of the electric circuit 90 will become more apparent in the following paragraphs. Generally, the electric circuit 90 comprises a plurality of beverage brew timers, namely a coffee brew timer 92, a tea brew timer 94, a plurality of switch means or switches 96, 98, 100, and 102, and indicator lights 68 and 104. The coffee brew timer 92 is of known construction, and controls the duration of the coffee brewing cycle. The coffee brew timer 92 must be energized in order to brew coffee. The tea brew timer 94 is constructed similar to the coffee brew timer 92, and functions similarly with respect to the tea brewing cycle as the coffee brew timer functions with respect to the coffee brewing cycle. The electric circuit 90 prevents coterminous energizing of the coffee and tea brew timers 92 and 94. Coffee nor tea can be brewed unless the coffee brew timer 92 or the tea brew timer 94, respectively, is energized.

A first switch 96 is a spring loaded, momentary contact start switch which energizes either the coffee brew timer 92 or the tea brew timer 94, depending on the position of the decanter support platform 38. A second switch 98 and a third switch 100 are spring loaded switches mounted on the beverage brewing device 10 in positions where they can be actuated by the decanter support platform 38. A fourth switch 102 is connected electrically to and controls the indicator lights 104. The second switch 98 is connected electrically to the tea brew timer 94, and to the indicator lights 104 through the fourth switch 102. The third switch 100 is connected electrically to the warming plate 40, the indicator light 68, and the indicator lights 104 through the fourth switch 102.

The second and third switches 98 and 100 control the operation of the beverage brewing device 10 according to the position of the decanter support platform 38. Specifically, when the decanter support platform 38 is in the extended position, the second switch 98 is open and the third switch 100 is closed, due to contact, or lack thereof, with the decanter support platform 38. With the second switch 98 being open, the tea brew timer 94 is dormant, and tea cannot be brewed. However, the coffee brew timer 92 is energized, thereby allowing the beverage brewing device 10 to brew coffee, which is shown by the indicator lights 104, which now are lit in a certain configuration due to the fourth switch 102. Simultaneously, with the third switch 100 being closed, the warming plate 40 is energized, thereby allowing the warming plate 40 to maintain the temperature of the beverage in the small decanter 32. When the third switch 100 is closed, the indicator light 68 associated with the warming plate 40 is lit.

When the decanter support platform 38 is in the retracted position, the second switch 98 is closed and the third switch 100 is open, due to contact, or lack thereof, with the decanter support platform 38. With the second switch 98 being closed, the tea brew timer 94 is energized, and the coffee brew timer 92 is dormant. Thus, tea, but not coffee, can be brewed by the beverage brewing device 10. Also, because the third switch 100 is open, the warming plate 40 and the indicator light 68 are dormant. The fourth switch 102 lights the indicator lights 104 in a certain configuration representing the current status and operability of the beverage brewing device 10.

Figure 3:
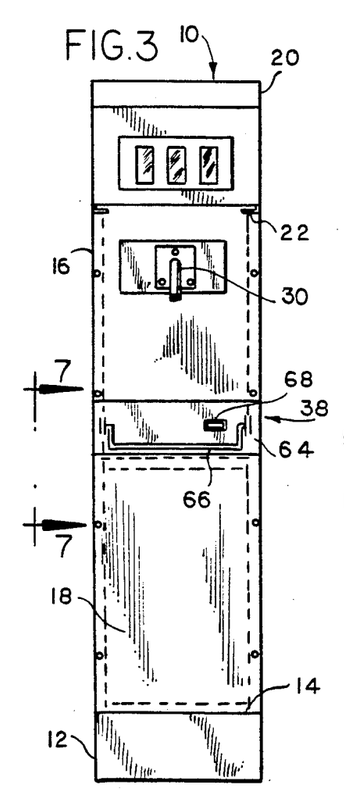
FIG. 3 is a front elevational view of the device of FIG. 1, without a brewing funnel or decanter engaged.

The operation of the decanter support platform 38 will become more clear in the following discussion. Beginning with the support platform 38 in the retracted position, as shown in FIG. 3, the beverage brewing device 10 is ready to brew iced tea, and deposit the freshly brewed beverage in the large decanter 24. The decanter support platform 38 is in the retracted position, thereby closing the second switch 98 and opening the third switch 100. With the large decanter 24 in place, as shown in FIG. 2, brewing can begin, and continue until the large decanter 24 is full. The large decanter 24 need not be removed from the brewing device 10 in order to serve brewed beverages. The large decanter 24 has a spigot 70 which allows for the free flow of brewed beverage from the interior of the decanter 24 into any other container.

Figure 4:
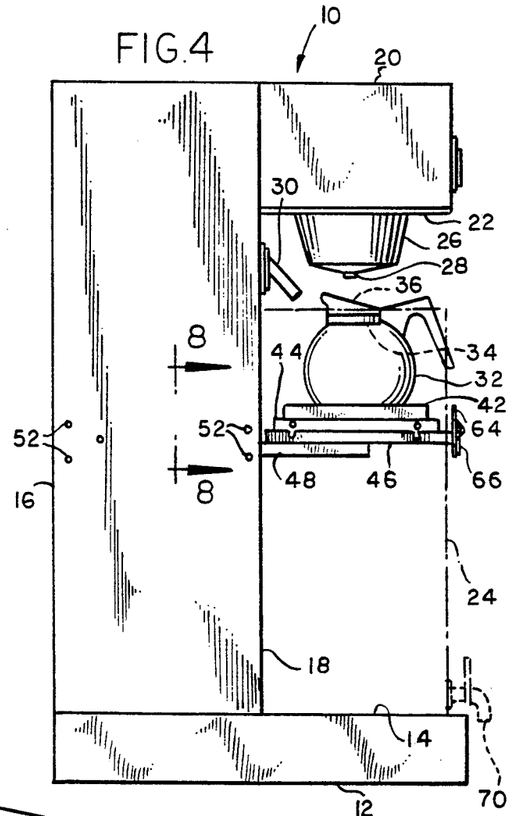
FIG. 4 is a side elevational view of the device of FIG. 1, with the decanter support platform in its extended position, a decanter disposed on top of the decanter support platform, and a brewing funnel disposed beneath the overhanging portion of the device.

When it is desired to brew coffee, an operator removes the large decanter 24 from the position shown in FIG. 2, and then applies a pulling force to the handle 66, which causes the decanter support platform 38 to translate from the retracted position to the extended position, as shown in FIG. 1, and FIG. 4. More specifically, the pulling force applied to the handle 66 causes the sliding portion 46 to translate forwardly out of the trunk portion 16 of the brewing device 10. This translation is governed by the length of the slots 60, which allow the sliding portion 46 to translate forwardly only a certain distance. When an end of the slots 60 engages a screw 56, further translation of the sliding portion 46 in the slots 60 is prohibited. When this engagement occurs, the pulling force then acts on the retracting portion 48.

Under the influence of the pulling force, the retracting portion 48 translates forwardly out of the trunk portion 16 of the brewing device 10. The retracting portion 48 translates slidably while in constant contact with the mounting portion 50, which remains stationary inside the trunk 16. With the base 44 in the properly extended position, the retainer 42, and the warming plate 40 are disposed so as to hold the small decanter 32 in the proper position underneath the opening 28 of the brewing funnel 26. The second switch 98 is opened, and the third switch 100 is closed, and the warming plate 40 is actuated by the electric circuit 90 so as to maintain the beverage at the appropriate temperature. The first switch 96 is momentarily closed to energize the coffee brew timer 92. To use the large decanter 24 again, all that is necessary is to reverse the above-disclosed process.

Figure 9:
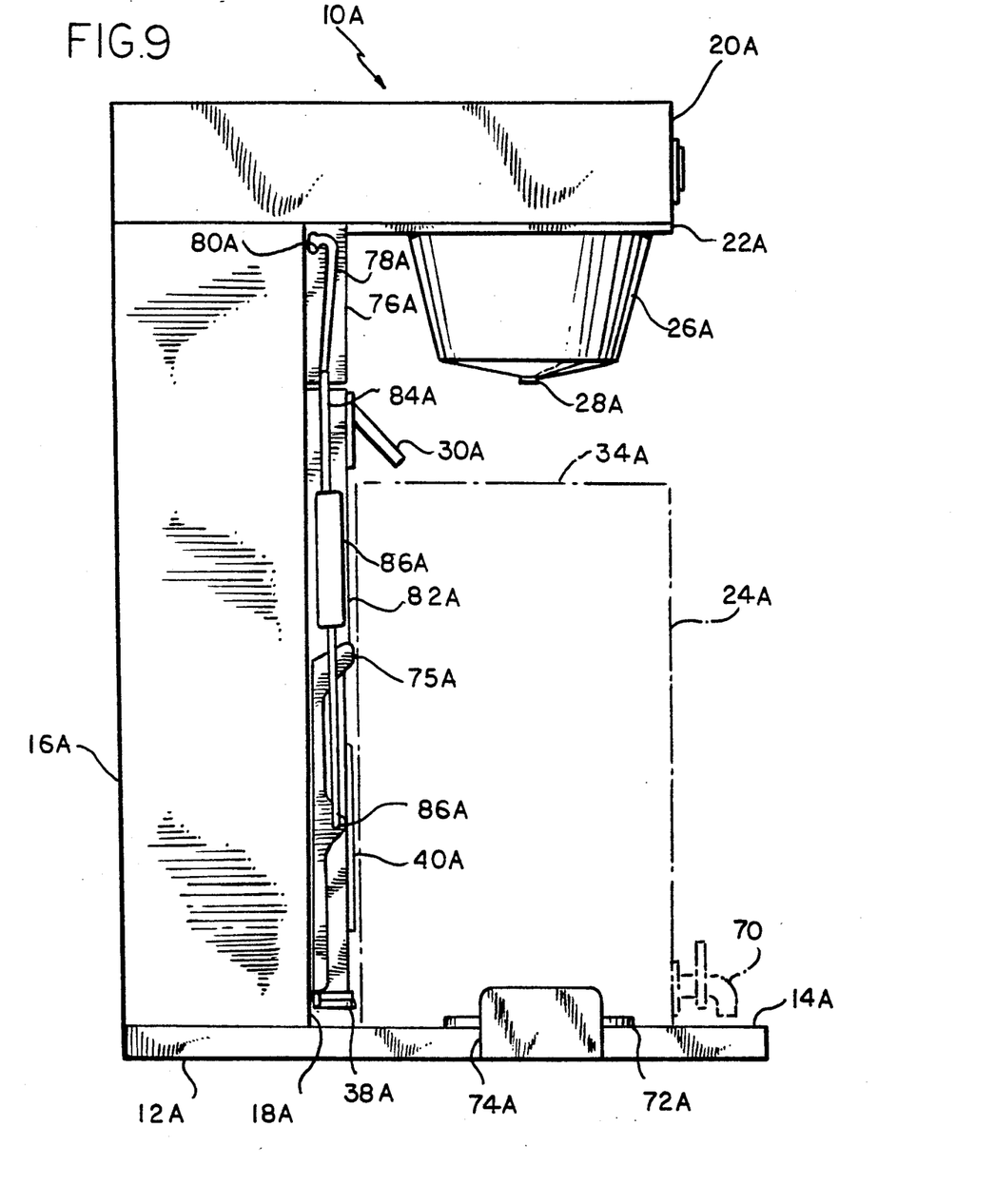
FIG. 9 is a side elevational view of an alternative embodiment of the present invention, possessing a retractable decanter support platform pivotally mounted on the trunk portion of the beverage brewing device, with the decanter support platform retracted, and the base portion supporting a large decanter.
Figure 10:
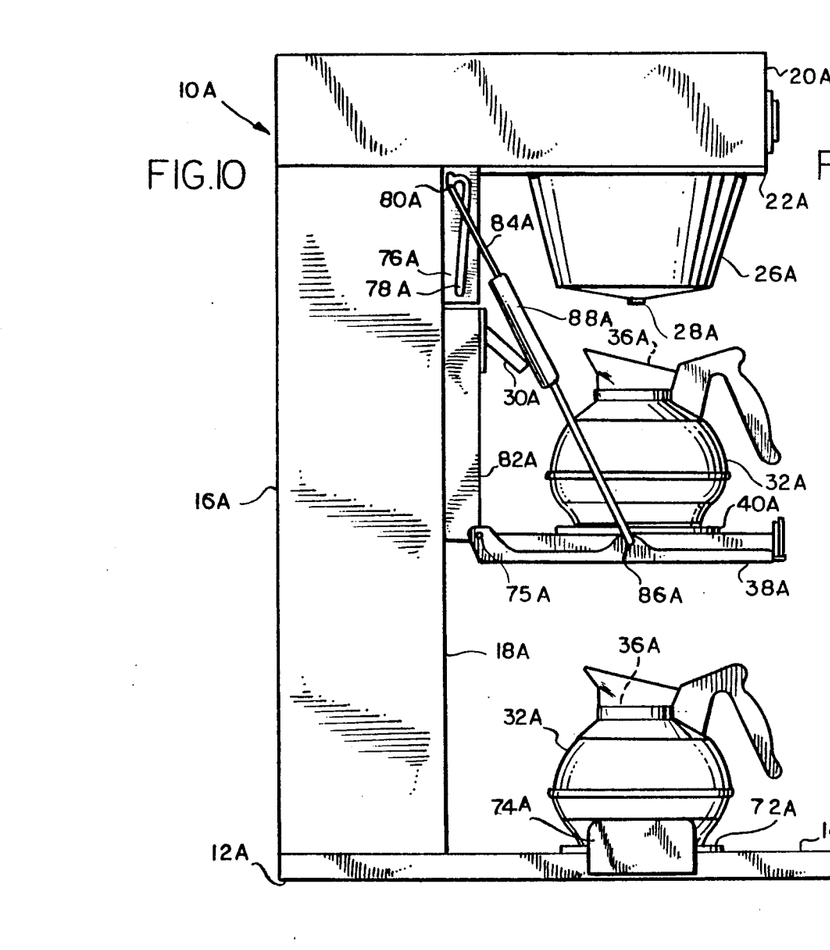
FIG. 10 is a side elevational view of the device of FIG. 9, showing the decanter support platform in an extended position supporting a small decanter, and the base portion also supporting a small decanter.
Figure 11:
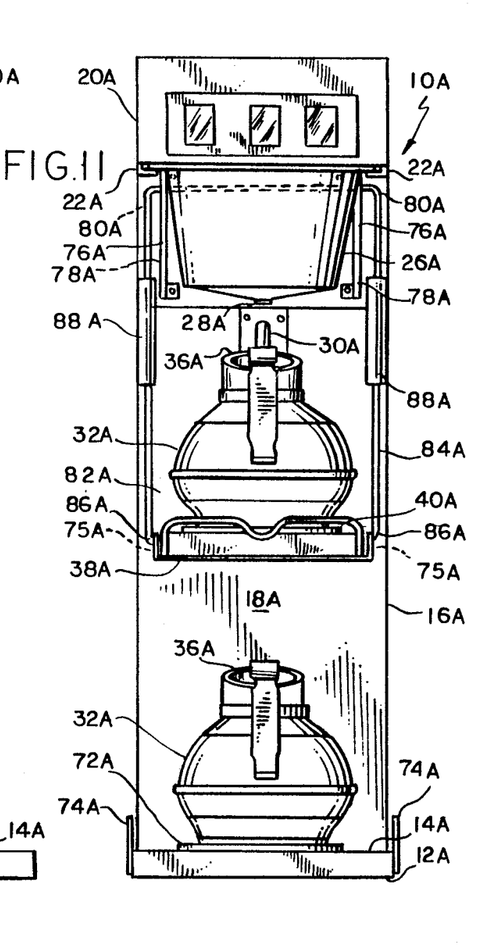
FIG. 11 is a front elevational view of the device of FIG. 10.

Another embodiment of the present invention is depicted in FIG. 9 through 11. This other embodiment retains many of the above-described benefits and elements. Like elements will be indicated by like reference numerals having the suffix "A." A beverage brewing device 10A can also be used with either a large decanter 24A of a small decanter 32A. The overall general construction of the beverage brewing device 10A is substantially similar to that of the beverage brewing device 10, except for the differences that will be detailed in the following discussion.

The base portion 12A of the beverage brewing device 10A has a base warming plate 72A disposed thereon. The base warming plate 72A is similar in construction and operation to the warming plate 40 disposed on the decanter support platform 38. The base warming plate 72A is designed to maintain the temperature of a beverage contained within the small decanter 32A, but may also maintain the temperature of the large decanter 24A. There are large decanter positioners 74A disposed about the base portion 12A. The large decanter positioners 74A serve as guides for proper placement of the large decanter 24A upon the base portion 12A, and help to support the large decanter 24A in proper disposition.

The decanter support platform 38A of the beverage brewing device 10A differs substantially from that of the beverage brewing device 10 in construction and operation. Instead of the decanter support platform 38A being retractable into the trunk portion 16A of the beverage brewing device 10A, the decanter support platform 38A is constructed so as to pivot about a pivot stud 75A between an extended and a retracted position. In the extended position, the decanter support platform 38A is capable of supporting a small decanter 32A in a disposition appropriate for accepting a brewed beverage; in the retracted position, however, the decanter support platform 38A lies flush against and in confrontation with the trunk portion 16A, as is shown clearly in FIG. 9. With the decanter support platform 38A in the retracted position, the beverage brewing device 10A is capable of accepting a large decanter 24A.

A rod guide 76A confronts the overhanging portion 20A along one edge thereof, and is disposed directly beneath the overhanging portion 20A. The rod guide 76A extends substantially perpendicularly downward from the overhanging portion 20A, and confronts the trunk portion 16A along another edge thereof. The rod guide 76A has a substantially longitudinal channel 78A therein, which terminates at one end thereof in a latch 80A. Preferably, a rod guide 76A is disposed on each side of the trunk portion 16A. The construction and operation of the channel 78A and the latch 80A will become more clear herein.

The rod guide 76A only extends a certain distance downward from the overhanging portion 20A. A decanter support platform mount 82A is disposed below the rod guide 76A, and also confronts the trunk portion 16A. The pivot stud 75A is located at an end of the mount 82A opposite to an end thereof which confronts the rod guide 76A. The pivot stud 75A pivotally attaches the decanter support platform 38A, at one end thereof, to the mount 82A. In this manner, the decanter support platform 38A is capable of pivotal rotation between the retracted and extended positions about the pivot stud 75A. As shown in FIG. 9, when the decanter support platform 38A is in the retracted position, the entire surface of the trunk portion 16A, from the overhanging portion 20A to the base portion 12A, is confronted by the rod guide 76A, the mount 82A, and the decanter support platform 38A.

The channel 78A and the latch 80A are of sufficient size to accept a decanter support platform support member or rod 84A. The rod 84A is substantially U- shaped, and extends through the channels 78A in each of the rod guides 76A, downward on each side of the beverage brewing device 10A to pivot points 86A disposed on the decanter support platform 38A. The rod 84A is pivotally mounted to the decanter support platform 38A at the pivot points 86A. The rod 84A is capable of free translation within the channel 78A, and is capable of locking in place in the latch 80A under the influence of gravitational forces. In order to facilitate pivoting of the decanter support platform 38A, translation means or handles 88A are disposed on the rod 84A.

The method of pivoting the decanter support platform 38A will become clear in the following discussion. Beginning with the decanter support platform 38A in the retracted position, as in FIG. 9, all decanters are removed from the beverage brewing device 10A. This is advised because there must be sufficient space available in front of the trunk portion 16A to allow for the pivoting of the decanter support platform 38A. An operator then grips the handles 88A and applies an upwardly directed force thereto. This force causes the rod 84A to translate upwardly, towards the overhanging portion 20A, within the channel 78A. As the rod 84A translates upwardly, the distance between the rod 84A and the overhanging portion 20A is decreased.

As the distance between the overhanging portion 20A and the rod 84A decreases, the force causes the decanter support platform 38A to pivot with respect to the rod 84A about the pivot points 86A, and with respect to the mount 82A about the pivot stud 75A. As the decanter support platform 38A so pivots, the platform 38A sweeps out an angle with respect to the trunk portion 16A. As the rod 84A reaches the end of the channel 78A proximate to the overhanging portion 20A, the angle approaches 90 degrees in arc. The rod 84A is forced into the latch 80A, and settles there. When the rod 84A has settled in the latch 80A, then angle is substantially right, as shown in FIG. 10 and 11, and the decanter support platform 38A is held in that disposition by gravitational forces pulling downwards on the platform 38A.

In order to reverse the process, and return the decanter support platform 38A to the retracted position, an operator again grasps the handles 88A and applies an upwardly directed force. This force translates the rod 84A upward and out of the latch 80A. Now the rod 84A is free to translate through the channel 78A towards an end thereof proximate to the mount 82A. Once the rod 84A reaches that end, the decanter support platform 38A confronts the trunk portion 16A and the angle measures zero degrees. The beverage brewing device 10A also has an electric circuit 90A which functions similarly to the electric circuit 90, depending on the position of the decanter support platform 38A.

The employment of the combined coffee and tea brewer of the present invention presents numerous advantages to the commercial user. A single beverage brewing device 10 fulfills the employment of two brewing devices in that the brewing device 10 can be used with both a small decanter 32, and a large decanter 24. Also, the distance between the opening 28 of the brewing funnel 26, and either the opening 34 or 36 of the large or small decanters 24 or 32, respectively, is kept constant, as shown in FIG. 4, so as to minimize the chance of beverage splattering, or of beverage reaction with the atmosphere.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A beverage brewing machine for brewing a beverage and for delivering a brewed beverage to a decanter, the machine comprising: means for brewing a beverage; means operatively connected to the means for brewing for discharging the brewed beverage at a predetermined beverage discharge point; a first support for a beverage decanter located beneath and in alignment with the discharge point; a second decanter support located beneath and in alignment with the discharge point and above the first support; and means for shifting the second support between an extended position for supporting a decanter in alignment with the discharge point, and a retracted position for avoiding interference with a decanter placed on said first support whereby the brewing device may selectively deliver a beverage to a first decanter on the first support when the second support is in the retracted position, and to a second decanter on the second support when the second support is in the extended position.

2. A beverage brewing machine as defined in claim 1 further comprising a first decanter positionable on the first support; the first decanter having an upper inlet opening and a height sufficient to locate said upper inlet opening adjacent said discharge point; a second decanter selectively positionable on the second support; and the second decanter having an upper inlet opening and a height less than the first mentioned height and sufficient to locate said upper inlet opening of said second decanter adjacent the said discharge point.

3. A beverage brewing machine as defined in claim 1 wherein the second decanter support is shiftable for allowing the beverage brewing machine to accept decanters of varying sizes.

4. A beverage brewing machine as defined in claim 1 wherein the second decanter support comprises a mounting portion, a retracting portion, a sliding portion, and a base; the mounting portion being mounted immovably inside the beverage brewing machine; the retracting portion being translatably mounted on the mounting portion; the sliding portion being translatably mounted on the retracting portion; the base being immovably mounted on the sliding portion; the retracting portion and the sliding portion for translation between at least two positions for allowing the machine to accept decanters of varying sizes; and the base for supporting a decanter for accepting a brewed beverage produced by the beverage brewing machine.

5. A beverage brewing machine as defined in claim 1 further comprising means for maintaining constant a distance of beverage travel from the beverage discharge point to upper inlet openings of the first and second decanters.

6. A beverage brewing machine as defined in claim 1 wherein the second decanter support comprises a pull out drawer.

7. A beverage brewing machine as defined in claim 1 wherein the second decanter support comprises a platform pivotally connected to the machine at a point and variably connected to the machine by a rod.

8. A beverage brewing machine for brewing a beverage and for delivering a brewed beverage to a decanter, the machine comprising: means for brewing a beverage;

a decanter support platform located adjacent the means for brewing movable between at least a retracted position and an extended position for supporting a decanter in operative alignment with said means for brewing such that a brewed beverage produced by said means can be delivered to said decanter; decanter support platform support means movable attaching the decanter support platform to a portion of the beverage brewing machine and supporting the decanter support platform; moving means for moving the decanter support platform between the retracted and the extended positions; and the means for brewing producing beverages when the decanter support platform is in both the retracted and the extended positions.

9. A beverage brewing machine as defined in claim 8 further comprising an electric circuit for controlling operation of the beverage brewing machine in relation to decanter support platform position.

10. A beverage brewing machine as defined in claim 8 further including an upstanding trunk portion, and the support means including slide means for locating the retracted position substantially within the trunk portion and the extended position projecting laterally outwardly of the trunk portion.

11. A beverage brewing machine as defined in claim 8 further comprising an upstanding trunk portion; the support means including means pivotally connecting the decanter support platform with the trunk portion for movement of the platform between the retracted position extending generally along the trunk portion and the extended position extending laterally from the trunk portion; and connecting rod means extending between the trunk portion and the decanter support platform for selectively positioning the support platform in the extended and the retracted positions.

12. A beverage brewing machine as defined in claim 8 further comprising warming plate means for applying thermal energy to a decanter disposed on the decanter support platform; and switch means for energizing the warming plate means when the decanter support platform is in the extended position and for preventing energizing of the warming plate means when the decanter support platform is in the retracted position.

13. A beverage brewing machine as defined in claim 8 further comprising an electric circuit having at least one beverage brew timer for permitting operation of the beverage brewing machine for a certain time period for producing a beverage; and switch means for energizing the beverage brew timer in relation to decanter support platform position.

14. A beverage brewing machine comprising: a decanter support platform movable between at least a retracted position and an extended position; decanter support platform support means movably attaching the decanter support platform to a portion of the beverage brewing machine and supporting the decanter support platform; moving means for moving the decanter support platform between the retracted and the extended positions; the beverage brewing machine producing beverages in both the retracted and the extended positions; and an electric circuit having a first brew timer for causing the beverage brewing machine to produce a first beverage for a first time period when the decanter support platform is in the extended position, and having a second brew timer for causing the beverage brewing machine to produce another beverage for a second time period when the decanter support platform is in the retracted position.

* * * * *